(12) United States Patent
Kithany

(10) Patent No.: US 12,250,343 B2
(45) Date of Patent: Mar. 11, 2025

(54) ALTERNATE COMMUNICATION OPTIONS DURING COMMUNICATION DELAY

(71) Applicant: LIVEPERSON, INC., New York, NY (US)

(72) Inventor: Manoj Kithany, New York, NY (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 18/431,144

(22) Filed: Feb. 2, 2024

(65) Prior Publication Data

US 2024/0267461 A1    Aug. 8, 2024

Related U.S. Application Data

(60) Provisional application No. 63/443,193, filed on Feb. 3, 2023.

(51) Int. Cl.
| | | |
|---|---|---|
| H04M 3/493 | (2006.01) | |
| H04M 3/428 | (2006.01) | |
| H04M 3/51 | (2006.01) | |
| H04M 3/523 | (2006.01) | |
| H04M 3/533 | (2006.01) | |

(52) U.S. Cl.
CPC ....... *H04M 3/4936* (2013.01); *H04M 3/4283* (2013.01); *H04M 3/5166* (2013.01); *H04M 3/5235* (2013.01); *H04M 3/5335* (2013.01); H04M 2201/40 (2013.01)

(58) Field of Classification Search
CPC ............. H04M 3/4936; H04M 3/4283; H04M 3/5166; H04M 3/5235
See application file for complete search history.

(56) References Cited

U.S. PATENT DOCUMENTS

| | | | | |
|---|---|---|---|---|
| 9,065,915 B1 * | 6/2015 | Lillard | .............. | H04M 3/42382 |
| 9,848,082 B1 * | 12/2017 | Lillard | .............. | H04M 3/53341 |
| 2021/0127010 A1 | 4/2021 | Dougherty et al. | | |

OTHER PUBLICATIONS

International Search Report and Written Opinion of Jun. 10, 2024 for PCT Application No. PCT/US2024/014207, 10 pages.

* cited by examiner

*Primary Examiner* — Amal S Zenati
(74) *Attorney, Agent, or Firm* — POLSINELLI LLP

(57) ABSTRACT

Systems and techniques are described herein for providing alternate options to a voice caller to record a message rather than be placed on or remain on hold. For example, a process may include: receiving a voice call; determining that no appropriate agent device of a plurality of agent devices are currently available to service the voice call; determining that a trigger condition is met, wherein the trigger condition determines whether an option to record a message is offered; providing a record message option, wherein the recorded message option is provided when the trigger condition is met; receiving a recorded message in response to providing the record message option; analyzing the recorded message to determine an intent; and providing the recorded message to an agent based on the intent, wherein the agent performs a response action after assessing the recorded message.

27 Claims, 6 Drawing Sheets

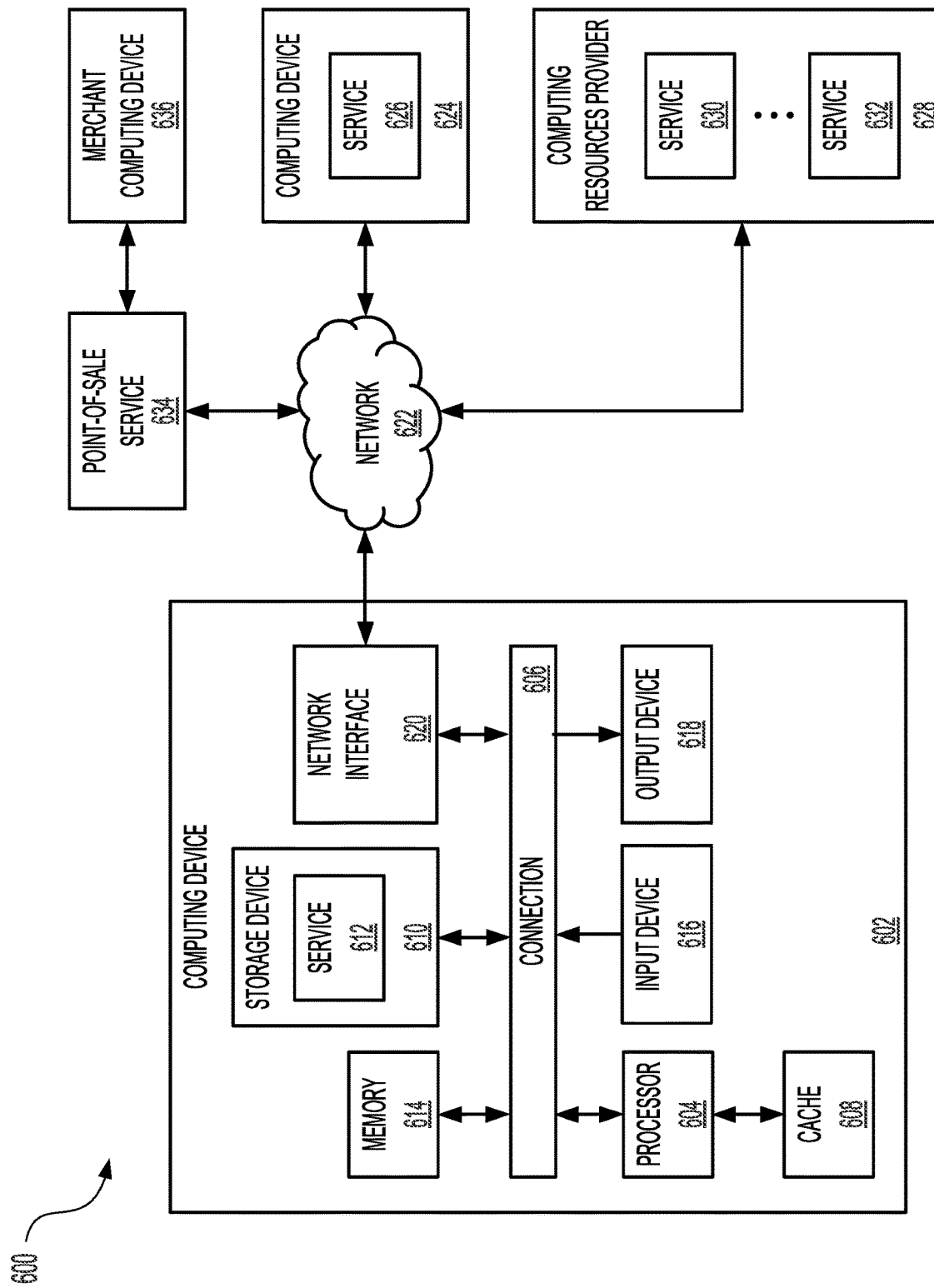

ALTERNATE COMMUNICATION OPTIONS DURING COMMUNICATION DELAY

CROSS-REFERENCE TO RELATED APPLICATIONS

This application claims the benefit of U.S. Provisional Application No. 63/443,193, filed Feb. 3, 2023, which is hereby incorporated by reference, in entirety and for all purposes.

FIELD

The present disclosure relates to systems and methods for providing additional communication options to a user when the user is attempting to engage in a voice interaction with an agent device.

SUMMARY

Systems and techniques are described herein for providing alternate options to voice callers that are on hold or who may be placed on hold. According to some aspects, a voice caller may be provided an option to record a message rather than to remain on and/or be placed on hold.

According to at least one example, a computer-implemented method is provided. The computer-implemented method includes: receiving a voice call; determining that no appropriate agent device of a plurality of agent devices are currently available to service the voice call; determining that a trigger condition is met, wherein the trigger condition determines whether an option to record a message is offered; providing a record message option, wherein the recorded message option is provided when the trigger condition is met; receiving a recorded message in response to providing the record message option; analyzing the recorded message to determine an intent; and providing the recorded message to an agent based on the intent, wherein the agent performs a response action after assessing the recorded message.

In another illustrative example, a system is provided. The system includes: one or more processors; and memory storing thereon instructions that, as a result of being executed by the one or more processors, cause the system to: receive a voice call; determine that no appropriate agent device of a plurality of agent devices are currently available to service the voice call; determine that a trigger condition is met, wherein the trigger condition determines whether an option to record a message is offered; provide a record message option, wherein the recorded message option is provided when the trigger condition is met; receive a recorded message in response to providing the record message option; analyze the recorded message to determine an intent; and provide the recorded message to an agent based on the intent, wherein the agent performs a response action after assessing the recorded message.

In another illustrative example, a non-transitory, computer-readable storage medium is provided. The non-transitory, computer-readable storage medium includes thereon executable instructions that, as a result of being executed by a computer system, cause the computer system to: receive a voice call; determine that no appropriate agent device of a plurality of agent devices are currently available to service the voice call; determine that a trigger condition is met, wherein the trigger condition determines whether an option to record a message is offered; provide a record message option, wherein the recorded message option is provided when the trigger condition is met receive a recorded message in response to providing the record message option; analyze the recorded message to determine an intent; and provide the recorded message to an agent based on the intent, wherein the agent performs a response action after assessing the recorded message.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

FIG. 6 shows a computing system architecture including various components in electrical communication with each other using a connection in accordance with various embodiments described herein.

Figure 1:
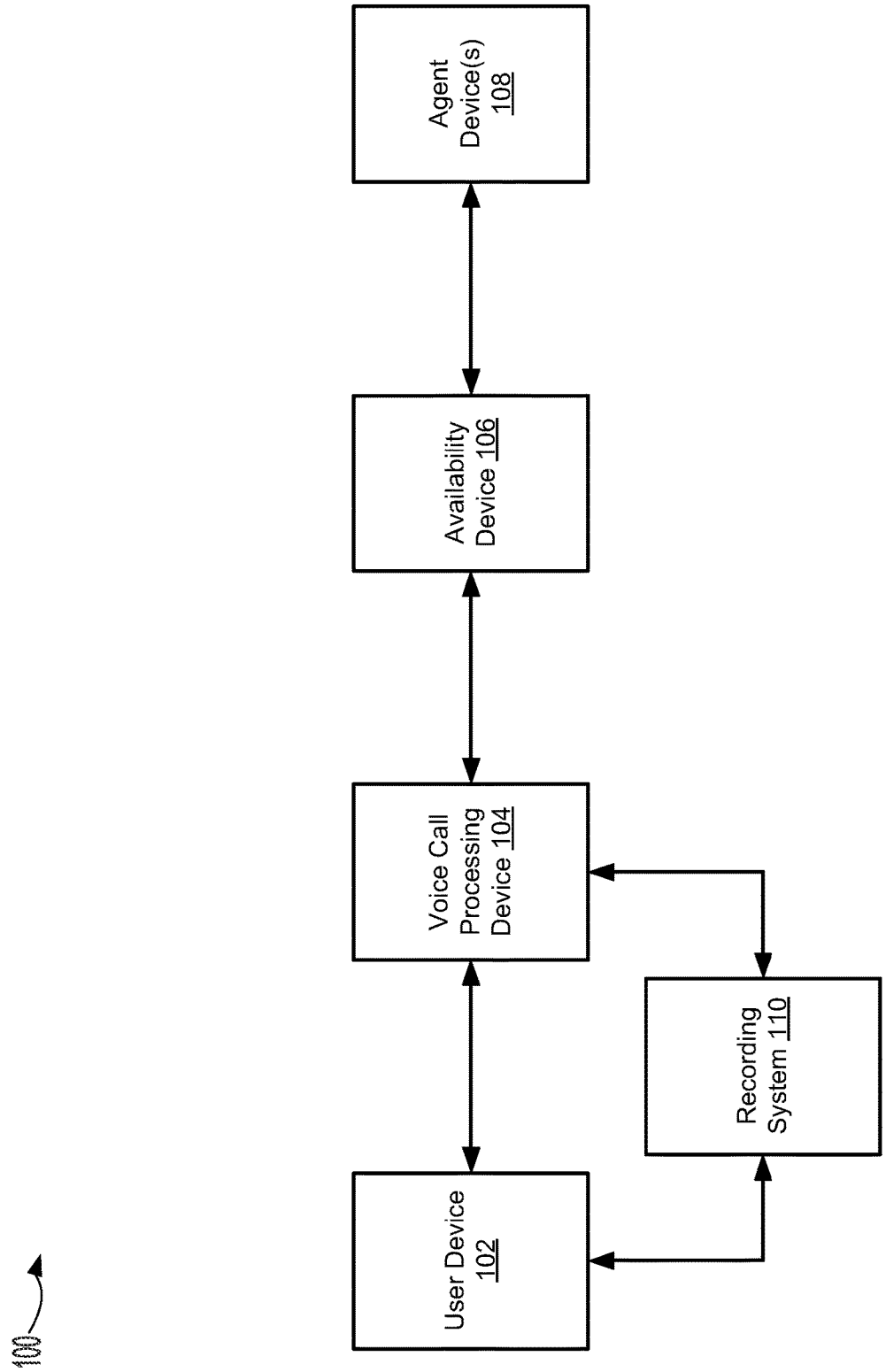
FIG. 1 shows an illustrative example of an environment in which a user device is used to initiate a voice call seeking service in accordance with one or more embodiments described herein.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The words "exemplary" and "example" are used herein to mean "serving as an example, instance, or illustration." Any embodiment or design described herein as "exemplary" is not necessarily to be construed as preferred or advantageous over other embodiments or designs.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment", one or more embodiments, or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

As used herein, the phrase operatively connected, or operative connection (or any variation thereof), means that there exists between elements/components/devices, etc. a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Embodiments described herein may provide a framework for a user seeking service via a voice call to have an option to record a message when placed on hold. A user may be placed on hold, for example, when a call volume at a given time exceeds the resources (e.g., human resources, compute resources, phone line resources, etc.) available at the time a user calls the entity from which the user seeks service. In one or more embodiments, the option to record a message allows a user to not be required to remain on hold while waiting to interact with an entity from which the user is seeking a service of some kind. When a user elects to record a message rather than remain on hold, the message may be assessed, and the content therein may, at least in part, determine which agent (e.g., human operator, bot, etc.) or set of agents are best suited and/or otherwise capable of addressing the content in the message. Once an identified agent becomes available, the agent may assess the content of the message to determine the service sought by the user, and take appropriate action to address the request. Thus, the option to record a message instead of remaining on hold may reduce or eliminate the amount of time a user spends on hold.

The option to record a message while on hold may be provided to the user, via a user device, any time a user is on hold or is to be placed on hold. The timing of the option being offered may be configurable, and may depend on any number of triggers (e.g., at beginning of hold, after a certain time threshold is passed, based on a decision from a machine learning algorithm using circumstances corresponding to the call as inputs, etc.). The option to leave a message may include an offer to communicate with the user at a future time, to resolve the issue and confirm resolution, etc.

The service sought by the user making a voice call may be any type of service that may be provided by an entity of any type (e.g., a service provider, a seller of goods, etc.). Examples of services for which a user may make a voice call to an entity include, but are not limited to, a customer service request, a technical support request, a request to pay a bill, a request to be told a balance of an account, a request to dispute a transaction, a request for a transaction history, a request for a refund, a question related to a good or service, a request to purchase a good or service, etc.

In one or more embodiments, a user may make a voice call using any type of user device (e.g., mobile phone, landline phone, computing device, etc.). The voice call may be initially received by a voice call processing device. The voice call processing device may interact with an availability device to determine if any one or more agents are available to communicate with the user. In one or more embodiments, if an agent (e.g., a human operator, a bot, etc.) is available, a communication channel between the user and the agent may be facilitated (e.g., the voice call is connected to an agent for further voice communication).

However, in one or more embodiments, an agent may not be available at the time a voice call is received from a user. As an example, human operator agents may not be available, as they are servicing other user calls. As another example, bots used for answering voice calls may be unavailable when a call volume exceeds a compute resource capacity available to respond to voice calls. In one or more embodiments, in such scenarios, a user may be provided with an option to record a message instead of waiting on hold.

An option to record a message may be an indication to the user that the user may record a message rather than remain on hold. Such an indication may inform the user of how to move forward with recording a message, and may also include other information (e.g., information about how many callers are ahead of the user, an estimated wait time for the user, information about expected subsequent communication in response to the message, etc.). As an example, a user may make a voice call seeking a service from an entity, and be placed on hold when no agent is available at the time of the call. In such a scenario, the user may be provided an audio message offering the opportunity to leave a message rather than to remain on hold, that the message will be addressed in the order received, and that the user may expect a communication back in response to the message.

The option to record a message while on hold may be provided at any time after a user makes a voice call to an entity. As an example, at the time a voice call is received, a voice call processing device and/or an operatively connected availability device may determine (e.g., based on queue depth, estimated wait time, etc.) that the call is to be placed on hold, and the option to record a message may be offered to the user prior to placing the user on hold. As another example, an option to record a message while on hold may be provided when one or more thresholds are reached (e.g., the user has remained on hold over a certain amount of time). As another example, the determination of when to provide to a user an option to record a message while on hold may be made using a machine learning algorithm. Inputs to such an algorithm may include, but are not limited to, queue depth (e.g., the number of users already holding), average or estimated time per call for voice interaction with agent, the time of year (e.g., it is a certain holiday season), whether new products and/or services have been recently released and/or are soon to be released, estimated wait time (which may be calculated using any number of the other factors), etc. Other inputs may be used without departing from the scope of embodiments described herein.

In one or more embodiments, an offer to record a message rather than remain on hold may be provided to a user based at least in part on estimated wait time, which may be a dynamic value. As an example, an estimated wait time may be a simple calculation of the average time per call multiplied by the number of users in the queue ahead of the user making the voice call. However, as other callers in the queue are serviced, the estimated wait time may change. For example, the estimated wait time may change as the queue number decreases, as other users take more or less than the average expected time to complete the call, as resources (e.g., human operators, compute resources, etc.) available to service voice calls changes, etc.

In one or more embodiments, a user makes a voice call to initiate a communication with an entity from which the user seeks a service. Examples of such a service include, but are not limited to, a request to pay a bill, a request to dispute a transaction, a request for a recent transaction history, a request for technical support, one or more questions regarding one or more goods and/or services, a request to order a good and/or service, a request to cancel on order for a good and/or service, a request to modify terms of a relationship between the user and the entity (e.g., get a new cable television plan), to add and/or remove a good and/or service, a request for other types of customer service, etc.

In one or more embodiments, after a user makes the voice call, as described above, the user may be provided with an option to record a message instead of being placed on or remaining on hold. The offer may indicate to the user how to initiate recording of a message (e.g., press a certain button, wait for a tone, just begin speaking, state a keyword and then begin speaking, etc.). In response, the user may then record a message. Such a message may, for example, provide information related to the reasons for the voice call (e.g., "I would like to dispute a transaction on my account"). In one or more embodiments, the recording also includes any other relevant information, such as an identification of the user, a preferred communication channel for receiving a response (e.g., best phone number), account information, information about a good and/or service, information identifying a particular transaction, etc. In one or more embodiments, all or any portion of such additional information, or any other pertinent information, may be ascertained by the voice processing system (e.g., using a caller identification technique to identify a source of the voice call, and a user associated with that source), and confirmation of the ascertained additional information may be sought from the user before after the message is recorded.

In one or more embodiments, once a user has recorded a message, the message may be analyzed to determine an intent of the message. As an example, the message may be provided as an input to a machine learning algorithm (e.g., an intent analyzer machine learning algorithm), which may analyze the content of the message to determine which one or more agents may be qualified to respond to the message. As an example, natural language processing may be performed on the message to determine the content therein, and the content may indicate that the user suspects that a fraudulent transaction has occurred on the user account. In such a scenario, the machine learning algorithm may predict that an agent from the fraud department is best suited to respond to the message.

In one or more embodiments, once one or more agents are identified that may be able to respond to a message, the message may be provided to the one or more agents (e.g., in the order messages are received). An agent may then listen to or otherwise assess the message when the agent becomes available. As an example, a message requesting assistance related to purchasing a service may be provided to a sales agent bot, which may assess the message when compute resources become available for the bot to do so.

In one or more embodiments, after an agent assesses a recorded message, the agent may perform an action in response (e.g., a response action) to the message. Such a response action may be any action for addressing the content of the message, such as, for example, initiating a communication (e.g., a callback) with the user that recorded the voice message, performing an issue resolution action, providing a confirmation of resolution of an issue, providing an answer to a question (e.g., a text message answering a question about a current price of an item), etc. Other actions may be considered response actions without departing from the scope of embodiments described herein.

Embodiments described herein may mitigate frustration or other types of user dissatisfaction when seeking a service from an entity via a voice call, where such dissatisfaction arises, at least in part, from being placed on hold. As an example, a user may desire to engage in other activities rather than have to remain on hold and paying attention until an agent answers the voice call. As another example, a user may have scheduled to do other things (e.g., catch a train, board a plane, drop children off at a daycare facility, etc.) that prevent the user from remaining on hold, which may cause the user to lose their place in a queue of callers waiting to speak with an agent. Embodiments described herein address such situations by providing the user with an option to record a message rather than to be put on or remain on hold. Such a message may provide the user an opportunity to express the reason for the voice call without having to remain on hold and without yet having reached an agent. The message may be analyzed to determine an intent (e.g., the reason for the voice call), which may allow the message to be provided to one or more agents suited to address the content of the message. In one or more embodiments, once an identified agent becomes available, the agent may assess the message, and perform an appropriate response action based on the content of the message. Thus, in one or more embodiments, the one or more reasons for the voice call may be addressed for the user by an agent without requiring the user to remain on hold until an agent becomes available.

Various aspects of the techniques and embodiments described herein will be discussed below with respect to the figures. FIG. 1 is a block diagram illustrating an example of an environment 100 in which a user, via a user device 102, may seek to interact with an entity via a voice call. The environment 100 may include a voice processing device 104, an availability device 106, one or more agent devices 108, and a recording system 110. Each of these components is described below.

In one or more embodiments, the user device 102, the voice call processing device 104, the accessibility device 106, the one or more agent devices 108, and/or the recording system 110 may each be, include, and/or be a portion of a computing device.

A computing device may any device, portion of a device, or any set of devices capable of electronically processing instructions and may include, but is not limited to, any of the following: one or more processors (e.g. components that include integrated circuitry, memory, input and output device(s) (not shown), non-volatile storage hardware, one or more physical interfaces, any number of other hardware components (not shown), and/or any combination thereof. Examples of computing devices include, but are not limited to, a mobile device (e.g., laptop computer, smart phone, personal digital assistant, tablet computer, automobile computing system, and/or any other mobile computing device), an Internet of Things (IoT) device, a server (e.g., a blade-server in a blade-server chassis, a rack server in a rack, etc.), a desktop computer, a storage device (e.g., a disk drive array, a fiber channel storage device, an Internet Small Computer Systems Interface (iSCSI) storage device, a tape storage device, a flash storage array, a network attached storage device, etc.), a network device (e.g., switch, router, multi-layer switch, etc.), a wearable device (e.g., a network-connected watch or smartwatch, or other wearable device), a robotic device, a smart television, a smart appliance, an extended reality (XR) device (e.g., augmented reality, virtual reality, etc.), any device that includes one or more SoCs, and/or any other type of computing device with the aforementioned requirements. In one or more embodiments, any or all of the aforementioned examples may be combined to create a system of such devices, which may collectively be referred to as a computing device. Other types of computing devices may be used without departing from the scope of embodiments described herein.

In some embodiments, a computing device includes at least one processor. In one or more embodiments, a processor (not shown) is any component that includes circuitry for executing instructions (e.g., of a computer program). As an example, such circuitry may be integrated circuitry implemented, at least in part, using transistors implementing such components as arithmetic logic units, control units, logic gates, registers, first-in, first-out (FIFO) buffers, data and control buffers, etc. In one or more embodiments, the processor may include additional components, such as, for example, cache memory. In one or more embodiments, a processor retrieves and decodes instructions, which are then executed. Execution of instructions may include operating on data, which may include reading and/or writing data. In one or more embodiments, the instructions and data used by a processor are stored in the memory of a computing device. A processor may perform various operations for executing software, such as operating systems, applications, etc. A processor may cause data to be written from memory to storage of a computing device and/or cause data to be read from storage via the memory. Examples of processors include, but are not limited to, central processing units (CPUs), graphics processing units (GPUs), neural processing units, tensor processing units, display processing units, digital signal processors (DSPs), finite state machines, etc. A processor may be operatively connected to a memory device, and/or any storage of the computing device.

In one or more embodiments, the user device 102 is any device that is configured to facilitate a user initiating and/or otherwise conducting a voice call with an entity. Examples of a user device include, but are not limited to, a cellular phone, a mobile phone, a tablet, any other type of computing device (described above), a landline telephone, a wireless telephone, etc. Any type of suitable technology may be used to initiate the voice call. Examples of such technologies include, but are not limited to, voice-over-Internet Protocol (VOIP) calling, voice calls using a cellular service, analog calling (e.g., via a landline telephone), etc.

In one or more embodiments, a user, via the user device 102, may initiate a voice call with an entity from which the user seeks performance of a service of any type. As an example, a user may use the user device 102 to make a voice call (e.g., initiate an operative connection) using contact information (e.g., a phone number) associated with an entity from which service is sought (e.g., a mobile device services provider, a cable provider, a purveyor of goods and/or services, etc.). For example, a user may use a mobile phone to initiate a voice call with a mobile device service provider by calling a phone number associated with the mobile device service provider.

In one or more embodiments, once a user initiates an interaction (e.g., calls) an entity, the call may be received, obtained, or otherwise intercepted by a voice call processing device 104. In one or more embodiments, the voice call processing device 104 is a computing device of any type (discussed above). In one or more embodiments, the voice call processing device 104 is an device configured to receive and process voice calls received from user devices. As an example, a voice call processing device may be configured to answer voice calls directed to any number of phone numbers associated with one or more entities. The voice call processing system may be configured to accept voice calls using any other form of voice call initiation without departing from the scope of embodiments described herein.

In one or more embodiments, the voice call processing device 104 is configured to perform one or more actions in response to receiving a voice call from the user device 102. In one or more embodiments, the voice call processing device 104 is configured to communicate with an availability device 106. In one or more embodiments, the availability device 106 is a computing device of any type (described above). In one or more embodiments, the availability device determines whether, at a given time, any one or more agents (e.g., human operators, bots, etc.) are available to provide service in response to a voice call received from a user device 102. In one or more embodiments, determining whether one or more agents are available includes assessing a set of agent devices 108 associated with the one or more agents to determine if any appropriate agent device is available to facilitate an interaction between an agent and a user device from which a voice call was initiated. In one or more embodiments, if an agent is available, the availability device 106 may provide an indication of the same to the voice call processing device 104. The voice call processing device 104 may then facilitate a voice call between the user device and the available agent using a corresponding agent device.

In one or more embodiments, no agents of a set of agents associated with one or more agent devices 108 are available to interact with the user device at the time a voice call is received from the user device. In one or more embodiments, an agent device 108 is any type of computing device (discussed above). In one or more embodiments, an agent device 108 is used by at least one agent to communicate, at least, with one or more users associated with one or more user devices (e.g., the user device 102), In one or more embodiments, when no agent is available to address a voice call from a user device, the availability device may determine various items of information related to the availability of one or more agents to service a voice call. Such a determination may be made at the time a voice call is received, and/or at any time thereafter while the user device 102 is attempting to connect with an agent (e.g., while the user is on hold). In one or more embodiments, the determination is made based on various factors that affect the amount of time a user may be projected to remain on hold prior to being connected with an agent. Examples of such factors include, but are not limited to, the number of other users in a queue of voice calls received before the current call, the average amount of time an agent spends on service calls, a time (e.g., time of day, time of month, time of year, holiday season, etc.). Such information may be used to dynamically determine an estimated wait time corresponding to a voice call received from a user device.

In one or more embodiments, the aforementioned types of information, any other items of information, the determined estimated wait time, etc. may be used to determine if and/or when to provide a user an offer to record a message rather than remain on hold until an agent becomes available. Additionally or alternatively, such information may be provided to a machine learning algorithm, which provides as an output a recommended time at which an offer to record a message should be provided to a user device 102. Such a machine learning algorithm is discussed further in the description of FIG. 2, below.

In one or more embodiments, the availability device 106 determines that no agent is available to respond to the received voice call when the voice call is received. In such scenarios, a user device may be provided with an option to record a message before or as a user using the user device 102 is placed on hold. As an example, the availability device 106 may determine that the user will be placed on hold for any amount of time, or for an amount of time over a time threshold (e.g., five minutes), and, in response to the determination, direct the voice call processing device 104 to provide the user with an option to record a message rather than to be put on hold to wait for the next available agent. In one or more embodiments, an option to record a message is provided after a user has remained on hold for a period of time. As an example, an availability device 106 and/or a voice call processing device 104 may be configured to provide an option to record a message at any time after a user has been placed on hold. For example, a user may be provide with an option to record a message after a hold time threshold is reached and/or exceeded (e.g., a user has been on hold more than four minutes). As another example, changing conditions may dictate that a user be offered an opportunity to record a message. For example, a series of prior calls taking longer than expected may increase the expected wait time for a voice caller, and the increase may trigger the user being provided with an option to record a message rather than remain on hold. As another example, a user may be provided with an indication that the user may remain on hold, but at any time while on hold may elect to record a message rather than remain on hold.

In one or more embodiments, whether and/or when to provide a user an option to record a message rather than remain on hold may be made based at least in part on any other types of information without departing from the scope of embodiments described herein. As an example, a voice call may be received from a particular phone number. The phone number may be associated with a particular user. Based on such information, an availability device 106 may access information corresponding to the user (e.g., included in a user profile) to determine when to provide to the user an offer to record a message rather than remain on hold. As an example, a user profile may indicate that the user is a valued customer (e.g., has been a long-term customer, regularly spends on an account, etc.) for whom service is to be expedited.

In one or more embodiments, an option to record a message is provided to a user via a user device 102 using any suitable method for providing an indication to a user. As an example, a user device 102 may be provided with an audio recording that includes information for a user related to the option to record a message. As an example, a user may be provided with an audio recording that indicates that the user may record a message rather than remain on hold, that the message will result in a response action being taken (e.g., a call back, a resolution of an issue, providing information in response to a query, etc.), how to initiate recording a message (e.g., press a button, begin talking, etc.), how to end/send a message (e.g., press a button to send, just hang up, etc.), etc.

In one or more embodiments, a user of a user device 102 may desire to record a message rather than remain on hold for any reason. Examples of such reasons include, but are not limited to, an approaching engagement during which the user cannot remain on hold, an amount of time after which a user is unwilling to remain on hold, receipt of another communication (e.g., another voice call) by the user, etc.

In one or more embodiments, once a user device has been provided an offer to record a message, a user may record a message via the user device interacting with a recording system 110. In one or more embodiments, the recording system 110 is any device capable of recording a voice message provided by a user via the user device 102. The recording system 110 may be a computing device of any type (described above). As such, the recording system 110 may include any components necessary for receiving as input a voice message from a user device, and for storing the received message as a recorded message.

In one or more embodiments, the recording system 110 is configured to provide a voice recording received from a user device to the voice call processing device 104. In one or more embodiments, the voice call processing device 104 is configured to provide recorded messages received from the recording system 110 to the availability device 106. In one or more embodiments, the availability device 106 is configured to analyze the voice recording. In one or more embodiments, the availability device 106 analyzes the recorded message to determine an intent based on the content of the recorded message. As an example, the availability device 106 may execute a machine learning algorithm to determine the intent of the recorded message based on an analysis of the content therein. As an example, the content of the recorded message may be subjected to natural language processing to determine one or more words, phrases, etc. stated in the recorded message. Such processed content may then be used as input to a machine learning algorithm to generate an output predicting the intent of the recorded message (e.g., fraud report, balance check, desire to purchase or return a good and/or service, seeking an answer to a question of a particular category, etc.). Such a machine learning algorithm is discussed further in the description of FIG. 3, below.

In one or more embodiments, after the intent of a recorded message is obtained, the availability device 106 may assess a set of one or more agent devices 108 to determine which agent devices are capable of responding to the content of the recorded message. Each agent device 108 may be associated with one or more agents. An agent may be a human operator, a bot, and/or any combination thereof. In one or more embodiments, a bot is a program configured to use prior knowledge of questions and corresponding answers, problems and corresponding solutions, etc. to interact with user while attempting to address queries received from a user (e.g., as part of a recorded message). In one or more embodiments, an entity may include and/or be associated with any number of agents. In one or more embodiments, agents may be associated with one or more skills, where the skills correspond to the suitability of a given agent to correctly handle a particular type of request (e.g., item returns). In one or more embodiments, only a subset of agents associated with a subset of agent devices 108 are configured to respond (e.g., for a bot) or capable of responding (e.g., for a human operator) to a recorded message that includes certain content. In one or more embodiments, the suitability of agents to respond to a particular recorded message may be ranked in order of most suitable to least suitable.

In one or more embodiments, the availability device 106 determines one or more suitable agents for responding to a recorded message. In one or more embodiments, after such an identification of one or more agents, the recorded message is provided to the one or more identified agents. In one or more embodiments, the agents may review and assess the recorded message after the agent becomes available (e.g., completes resolution of a prior call).

In one or more embodiments, an agent responding to a recorded message via an agent device 108 may perform any one or more response actions in response to receiving and assessing the recorded message. As an example, an agent may determine that an appropriate response to a recorded message is to initiate a communication with the user device from which the recorded message was received. Examples of such a communication include, but are not limited to, calling the user back using a phone number associated with the user, transmitting a text message to the user, transmitting a direct instant message to the user (e.g., via a social media channel), any other form of alternate message format, etc. As another example, an assessment of the recorded message may determine one or more actions that an agent may take to resolve an issue set forth in the recorded message by the user. In such a scenario, the agent may perform the one or more actions in order to resolve the issue. Optionally, the agent may initiate a separate communication to the user (e.g., via text, voice mail, email, etc.) that provides an indication that the issue was resolved (e.g., a disputed charge was credited back to a user account).

While FIG. 1 shows a certain number of components in a particular configuration, one of ordinary skill in the art will appreciate that the environment 100 may include more components or fewer components, and/or components arranged in any number of alternate configurations without departing from the scope of examples described herein. Additionally, although not shown in FIG. 1, one of ordinary skill in the art will appreciate that the environment 100 may execute any amount or type of software or firmware (e.g., bootloaders, operating systems, hypervisors, virtual machines, computer applications, mobile device apps, etc.). The components shown in FIG. 1 may or may not be discrete components. In some aspects, one or more of the components can be combined into different hardware elements, implemented in software, and/or otherwise implemented using software and/or hardware. As used herein, the term device may be a discrete component or apparatus, or may not be a discrete component. In some aspects, other devices can exist within, be part of, and/or utilize the same hardware components as a device. As an example, a voice call processing device and an availability device may be part of the same computing device. As another example, one or more agent devices may be part of the same computing device as an availability device and/or a voice call processing device. Accordingly, examples disclosed herein should not be limited to the configuration of components shown in FIG. 1.

Figure 2:
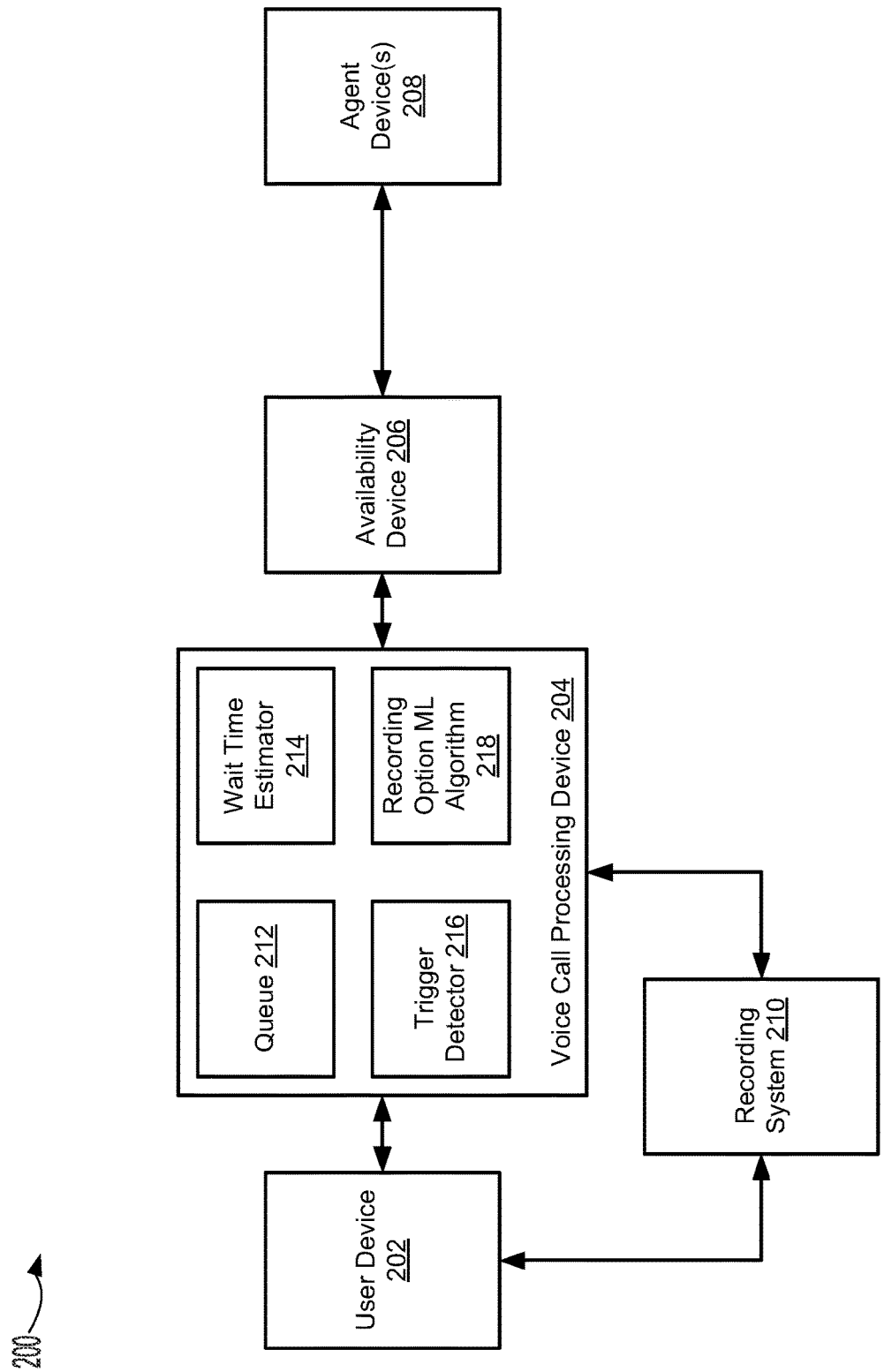
FIG. 2 shows an illustrative example of an environment in which a user device is used to initiate a voice call seeking service, showing an expanded view of a voice call processing device therein, in accordance with one or more embodiments described herein.

FIG. 2 is a block diagram of an environment 200 in accordance with one or more embodiments described herein. In one or more embodiments, the environment 200 is the same or similar to the environment 100 shown in FIG. 1 and described above. As such, the user device 202, the voice call processing device 204, the availability device 206, the agent device(s) 208, and the recording device 210 may be the same as or substantially similar to the like-named components shown in FIG. 1 and discussed above.

As shown, FIG. 2 includes additional details corresponding to the voice call processing device 204. In one or more embodiments, the voice call processing device 204 includes a queue 212. In one or more embodiments, the queue 212 is any hardware (e.g., circuitry), software, firmware, or any combination thereof that is configured to track the number of users currently waiting to interact with an agent. In one or more embodiments, the queue 212 includes a listing of users that initiated a voice call prior to such initiation by a present user. As an example, prior to a particular user initiating a voice call with an entity seeking to communicate with an agent, twenty-seven other callers may have done the same, and have not yet reached an agent. In such a scenario, the queue may include the twenty-seven other users as ahead of the currently calling user.

In one or more embodiments, the voice call processing device includes a wait time estimator 214. In one or more embodiments, the wait time estimator is any hardware (e.g., circuitry), software, firmware, or any combination thereof that is configured to estimate a wait time for a voice call received from a user device before such a call is answered by an agent. In one or more embodiments, the wait time estimator 214 is configured to use various items of information (e.g., number of users in the queue 212, average time an agent takes to resolve a voice call, etc.) to determine an estimated wait time for a given voice call.

In one or more embodiments, the voice call processing device 204 includes a trigger detector. In one or more embodiments, the trigger detector 216 is any hardware (e.g., circuitry), software, firmware, or any combination thereof configured to determine when a trigger occurs for providing a user with an offer to record a message. As an example, the trigger detector 216, may monitor an estimated wait time, queue depth, etc. to determine that a user should be provided an option to record a message instead of being placed on hold (though a user may still elect to remain on hold if they choose), or any time after the user has been placed on hold. As another example, the trigger detector 216 may monitor an amount time a user has been on hold, and when the amount of time exceeds a configured threshold, determine that a user should be provided with an option to record a message. As another example, the trigger detector 216 may interact with the recording option machine learning (ML) algorithm 218 to detect when the output of the algorithm indicates that the user should be provided with an option to record a message.

In one or more embodiments, the recording option ML algorithm 218 is any algorithm configured to provide an output indicating when a user should be provided an option to record a message. The recording option ML algorithm 218 may be executed using all or any portion of the compute resources of the voice call processing device 204. In one or more embodiments, the recording option ML algorithm 218 is provided with any number of inputs, which are processed by the recording option ML algorithm 218 to determine when to offer a user an option to record a message. As an example, the recording option ML algorithm 218 may be provided as input a current queue depth, an average time for an agent to address a voice call, an estimated wait time based on current conditions, information about the time of year (e.g., it is a holiday season), information about recent events related to the entity receiving the voice call (e.g., recent product launch, recent product recall, etc.), information about the user (e.g., from a user profile) such as length of time as a customer, spending habits, past instances of voice calls and how long the user was willing to remain on hold, user sentiment after being on hold for previous voice calls, etc. The input information may be processed by the recording option machine learning algorithm 218 to provide a trigger to the trigger detector 216 indicating when the user should be provided an option to record a message.

Other machine learning techniques may be used as part of the recording options ML algorithm 218 without departing from the scope of embodiments described herein. As an example, a clustering machine learning algorithm (e.g., k-means clustering algorithms, fuzzy c-means (FCM) algorithms, expectation-maximization (EM) algorithms, hierarchical clustering algorithms, density-based spatial clustering of applications with noise (DBSCAN) algorithms, etc.) may be used to identify when a user should be provided with an option to record a message rather than remain on hold. Such an identification may be based, at least in part, on an assessment of voice calls and corresponding responses for the current user and any number of other users having similar characteristics and for whom the option to record a message resulted in a more positive outcome (e.g., customer satisfaction) than causing the user to have to remain on hold in order to have a voice call addressed by an agent.

While FIG. 2 shows a certain number of components in a particular configuration, one of ordinary skill in the art will appreciate that the environment 200 may include more components or fewer components, and/or components arranged in any number of alternate configurations without departing from the scope of examples described herein.

Additionally, although not shown in FIG. 2, one of ordinary skill in the art will appreciate that the environment 200 may execute any amount or type of software or firmware (e.g., bootloaders, operating systems, hypervisors, virtual machines, computer applications, mobile device apps, etc.). The components shown in FIG. 2 may or may not be discrete components. In some aspects, one or more of the components can be combined into different hardware elements, implemented in software, and/or otherwise implemented using software and/or hardware. As used herein, the term device may be a discrete component or apparatus, or may not be a discrete component. In some aspects, other devices can exist within, be part of, and/or utilize the same hardware components as a device. As an example, a voice call processing device and an availability device may be part of the same computing device. As another example, one or more agent devices may be part of the same computing device as an availability device and/or a voice call processing device. As another example, all or any portion of the components of the voice call processing device may be combined, or may be implemented using more than one discrete components. Accordingly, examples disclosed herein should not be limited to the configuration of components shown in FIG. 2.

Figure 3:
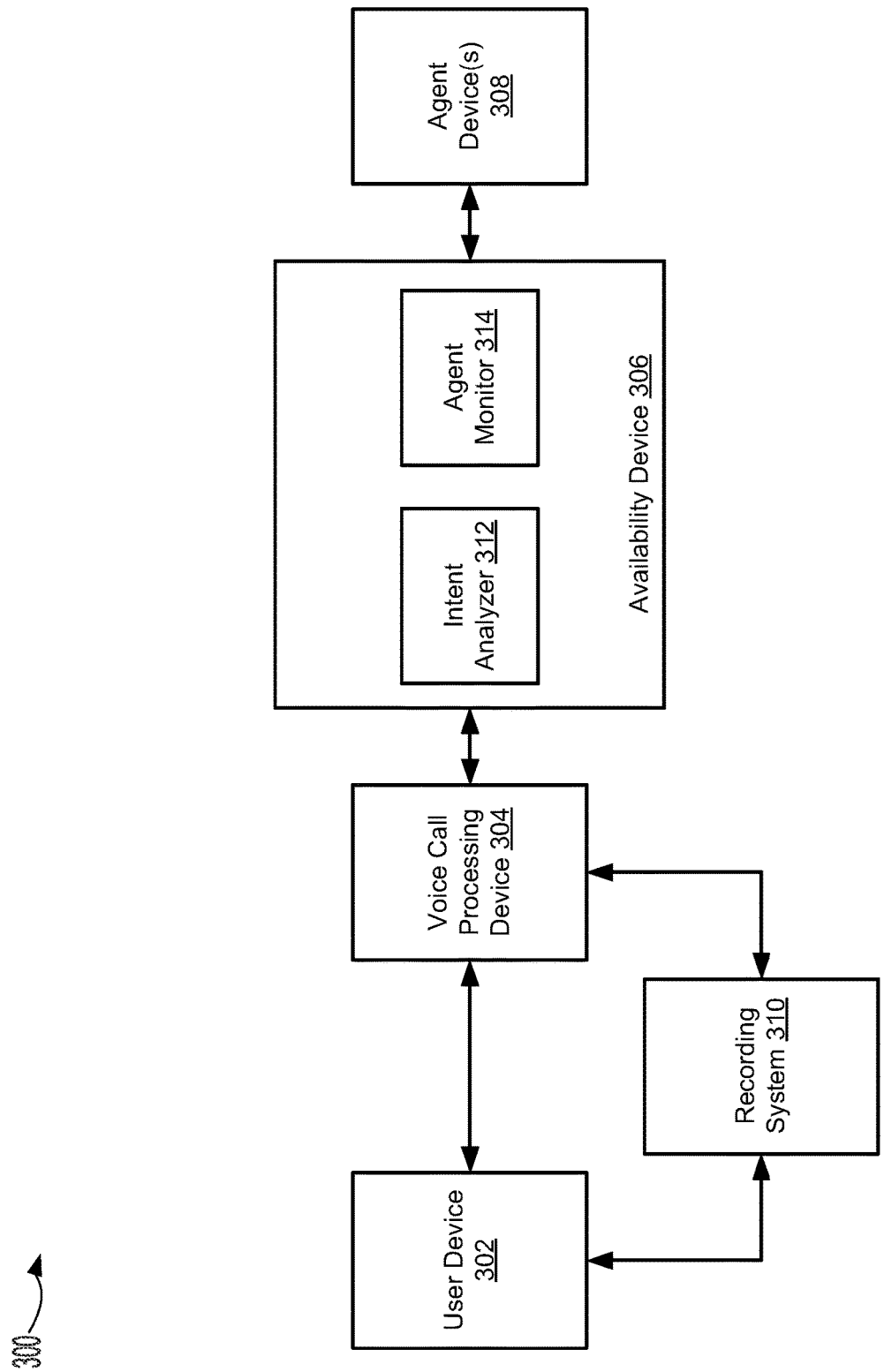
FIG. 3 shows an illustrative example of an environment in which a user device is used to initiate a voice call seeking service, showing an expanded view of an availability device therein, in accordance with one or more embodiments described herein.

FIG. 3 is a block diagram of an environment 300 in accordance with one or more embodiments described herein. In one or more embodiments, the environment 300 is the same or similar to the environment 100 shown in FIG. 1 and described above, and to the environment 200 shown in FIG. 2 and described above. As such, the user device 302, the voice call processing device 304, the availability device 306, the agent device(s) 308, and the recording device 310 may be the same as or substantially similar to the like-named components shown in FIG. 1 and in FIG. 2 and discussed above.

As shown, FIG. 3 includes additional details corresponding to the availability device 306. In one or more embodiments, the availability device 306 includes an agent monitor 314. In one or more embodiments, the agent monitor 314 is any hardware (e.g., circuitry), software, firmware, or any combination thereof that is configured to monitor and assess the state of one or more agent devices 308 and agents corresponding to such agent devices. As an example, the agent monitor 314 may monitor which agents are currently available to respond to voice calls, one or more skills associated with such agents, how long currently busy agents have been on a current voice call, how many voice calls are currently assigned to the agent that the agent has not yet responded to (e.g., answered), the average amount of time particular agents spend addressing voice calls, a total quantity of agents, quantities of agents having particular skills, agent work schedules (e.g., when shift changes are going to occur), etc. The agent monitor 314 may monitor any other information related to agents and/or agent devices 308 without departing from the scope of embodiments described herein.

In one or more embodiments, the availability device 306 includes an intent analyzer 312. The intent analyzer 312 may be any hardware (e.g., circuitry), software, firmware, or any combination thereof that is configured to analyze the content of a recorded message to determine an intent of the message. In one or more embodiments, the intent analyzer 312 includes a natural language processor (not shown) configured to process a recorded voice call to ascertain the words spoken by the user on the recorded message. In one or more embodiments, the natural language processor is or includes a natural language processing machine learning algorithm trained to take the recorded message as input, parse the message, and provide as output text corresponding to the content of the recorded message. In one or more embodiments, the intent analyzer includes a machine learning algorithm configured to assess the content of a recorded message (e.g., after being processed by a natural language processor) that is provided as input, and to predict the intent of the message. In one or more embodiments, the intent of a recorded message is a purpose that a user is attempting to achieve via the initially placed voice call, as expressed in the recorded message. As an example, a user may record a message that indicates that the user wishes to dispute a transaction, and the analysis of the recorded message by the machine learning algorithm may provide as an output that the intent of the message relates to possible fraud detection, and that an agent from the fraud department should receive the recorded message. As another example, a user may indicate having a technical question about a recently purchased good or service, and the machine learning algorithm may provide as output that the intent is to receive technical support, and that an agent from the technical support department should receive the recorded message. Any other intent of the recorded message may be ascertained without departing from the scope of embodiments described herein, and such an intent may allow for a prediction of an appropriate agent to address the recorded message.

Other machine learning techniques may be used as part of the intent analyzer 312 without departing from the scope of embodiments described herein. As an example, a clustering machine learning algorithm (e.g., k-means clustering algorithms, fuzzy c-means (FCM) algorithms, expectation-maximization (EM) algorithms, hierarchical clustering algorithms, density-based spatial clustering of applications with noise (DBSCAN) algorithms, etc.) may be used to determine an intent of a recorded message and/or which one or more agents are capable of handling the content of the recorded message. As an example, the machine learning algorithm of the intent analyzer 312 may assess any number of other recorded messages, the outcomes of providing such recorded messages to agents, etc. to determine a suggested one or more agents to which the current recorded message should be provided.

While FIG. 3 shows a certain number of components in a particular configuration, one of ordinary skill in the art will appreciate that the environment 300 may include more components or fewer components, and/or components arranged in any number of alternate configurations without departing from the scope of examples described herein. Additionally, although not shown in FIG. 3, one of ordinary skill in the art will appreciate that the environment 300 may execute any amount or type of software or firmware (e.g., bootloaders, operating systems, hypervisors, virtual machines, computer applications, mobile device apps, etc.). The components shown in FIG. 3 may or may not be discrete components. In some aspects, one or more of the components can be combined into different hardware elements, implemented in software, and/or otherwise implemented using software and/or hardware. As used herein, the term device may be a discrete component or apparatus, or may not be a discrete component. In some aspects, other devices can exist within, be part of, and/or utilize the same hardware components as a device. As an example, a voice call processing device and an availability device may be part of the same computing device. As another example, one or more agent devices may be part of the same computing device as an availability device and/or a voice call processing device. As another example, all or any portion of the components of the availability device may be combined, or may be implemented using more than one discrete components. Accordingly, examples disclosed herein should not be limited to the configuration of components shown in FIG. 3.

Figure 4:
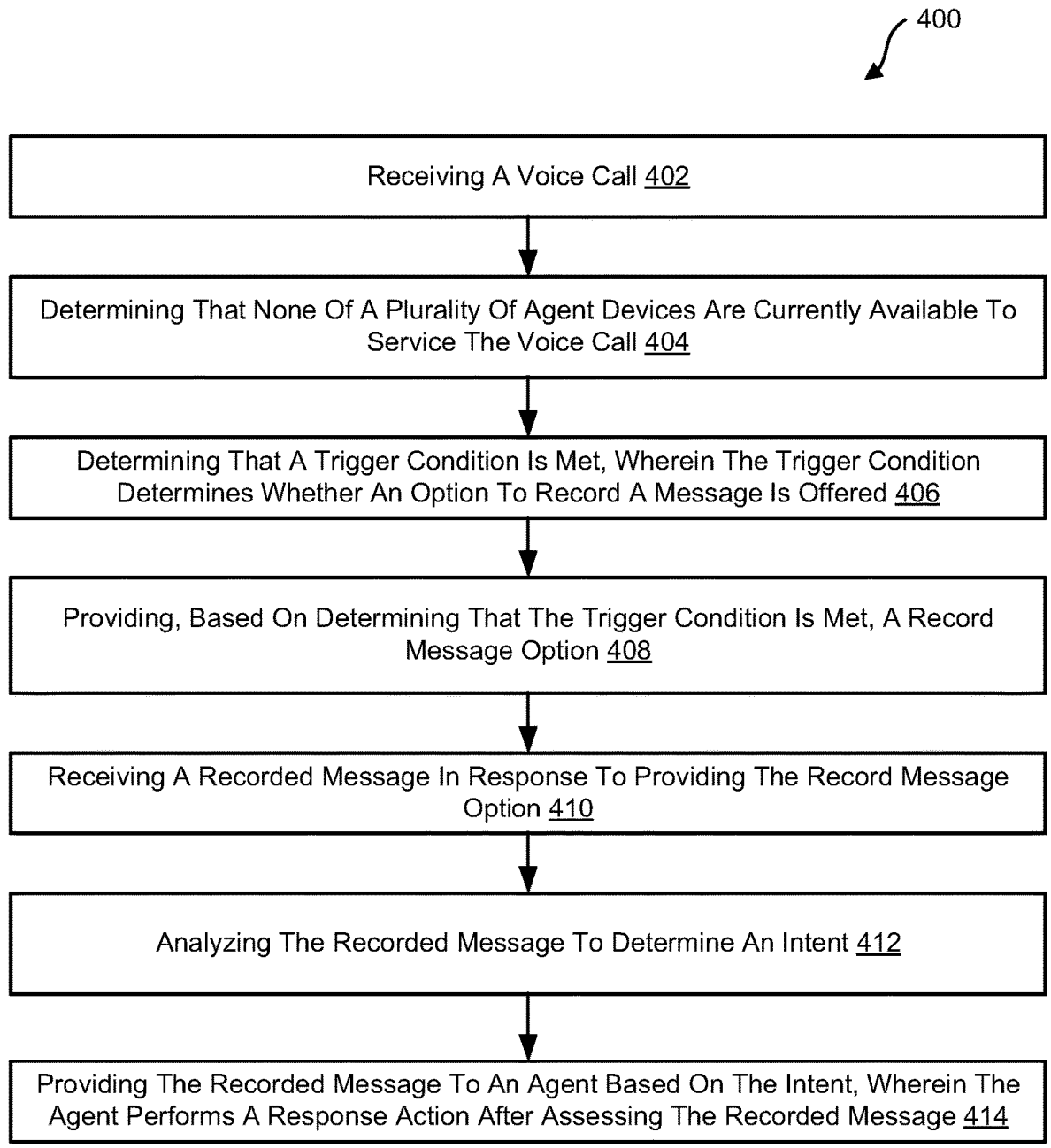
FIG. 4 shows an illustrative example of a process for providing a user an option to record a message in lieu of being on hold in accordance with one or more embodiments described herein.

FIG. 4 shows an illustrative example of a process 400 for providing a user with an option to record a message rather than remain on hold in accordance with one or more embodiments described herein.

At step 402, the process 400 includes receiving a voice call. A voice call may be received from a user device (e.g., the user device 102 of FIG. 1). In one or more embodiments, the voice call is received by a voice call processing device (e.g., the voice call processing device 104 of FIG. 1). The voice call may be received via any suitable technology for facilitating a voice call (e.g., analog phone service, VOIP phone service, cellular phone service, etc.).

At step 404, the process 400 includes determining that none of a plurality of agent devices are currently available to service the voice call. In one or more embodiments, a voice call processing device (e.g., the voice call processing device 204 of FIG. 2) interacts with an availability device (e.g., the availability device 306 of FIG. 3) to determine that no agent is currently available to service the voice call received at step 402. As an example, an agent monitor (e.g., the agent monitor 314 of FIG. 3) may determine that all agents are currently servicing other voice calls, and thus no agent is available to service the current voice call, and such information may be provided to the voice call processing device.

At step 406, the process 400 includes determining that a trigger condition is met, wherein the trigger condition determines whether an option to record a message is offered. The determination may be made by a trigger detector (e.g., the trigger detector 216 of FIG. 2). As discussed above, the trigger may be determined from any type of information relevant to the voice call, such as queue depth exceeding a threshold, estimated wait time exceeding a threshold, that a user has been on hold for more than a threshold amount of time, that a record option ML algorithm (e.g., the record option ML algorithm 218 of FIG. 2) provides as an output that the user should be provided with an option to record a message at a particular time (e.g., before being placed on hold, three minutes after being placed on hold, etc.).

At step 408, the process 400 includes providing, based on determining that the trigger condition is met, a record message option. In one or more embodiments, the record message option is provided to the user by a voice call processing device (e.g., the voice call processing device 204 of FIG. 2). In one or more embodiments, the option to record a voice message is provided via an audible message to the user. As an example, a pre-recorded set of one or more messages may be transmitted to a user device (e.g., the user device 102 of FIG. 1). Such messages may convey to the user any type of information related to the option to record a voice message rather than remain on hold. Examples of the types of information that may be include in such a communication to a user include, but are not limited to, an indication that the option exists, information related to how to exercise the option (e.g., press a button to begin recording, speak to begin recording, etc.), and indication of how to submit the recorded message (e.g., press the pound key, press the star key, just hang up, etc.), information regarding the response to the recorded message (e.g., you message will be addressed in the order in which it was received, expect a callback in a certain amount of time, etc.), information relating to why the option to record a message is being offered (e.g., there are currently X number of callers ahead of you in the queue and the wait time is Y minutes), etc.

The offer to allow the user to provide a recorded message may also include any amount of instruction on what content may be provided. As an example, a machine learning algorithm of an intent analyzer (e.g., the intent analyzer 312 of FIG. 3) may be configured to determine intent based on certain recorded message content, keywords therein, etc. In such a scenario, the offer to allow a user to record a message may include some instruction related to the type of content that, if expressed by the user in the recorded message, would be consumable as input by the machine learning algorithm of the intent analyzer. As an example, the user may be prompted to provide various items of information that include, but are not limited to, a name of the user, contact information for the user, a description of the reason for the voice call, identifying information about one or more accounts relating to the reason for the voice call, etc.

At step 410, the process 400 includes receiving a recorded message in response to providing the record message option. In one or more embodiments, the recorded message is received by a voice call processing device (e.g., the voice call processing device 104 of FIG. 1). In one or more embodiments, the recorded message includes any amount of information, including, but not limited to, the information types discussed above. In one or more embodiments, the message is received vi a recording system (e.g., the recording system 110 of FIG. 1). In one or more embodiments, the recorded message is a voice recording of sounds emanated by a user via a user device. In one or more embodiments, the recorded message may be provided to an availability device. (e.g., the availability device 106 of FIG. 1).

At step 412, the process 400 includes analyzing the recorded message to determine an intent. In one or more embodiments, the analysis may be performed by an availability device (e.g., the availability device 306 of FIG. 3), or any component therein (e.g., the intent analyzer 312 of FIG. 3). In one or more embodiments, the intent may be determined by providing input to a machine learning algorithm of the intent analyzer. As an example, items of information such as queue depth, estimated wait time, user profile information, etc. may be provided as input to the machine learning algorithm. In one or more embodiments, the machine learning algorithm may process such inputs to provide an output indicative of one or more agents (e.g., bots, human operators) capable of responding to the content of the recorded message. In one or more embodiments, the set of agents capable of responding to the intent expressed in the recorded message may be provided to the voice call processing device.

At step 414, the process 400 includes providing the recorded message to an agent based on the intent, wherein the agent performs a response action after assessing the recorded message. In one or more embodiments, the recorded message may be placed in the queue of one or more agents identified in step 412 as capable of responding to the recorded message. In one or more embodiments, the recorded message may be assessed by an agent once the agent has completed one or more other tasks related to voice calls and/or recorded messages received prior to being provided the current recorded message. In one or more embodiments, an agent, via an agent device, responds to a recorded message by performing a response action. A response action may be any form of action taken in response to an agent assessing a recorded message. As an example, a response action may include initiating a communication with the user from which a recorded message was received (e.g., via a callback, a text message, an instant message, a social media message, etc.), for example, to discuss the content of the recorded message with the user and, for example, obtain additional information regarding the circumstances leading to the user providing the recorded message. As another example, the recorded message may clearly provide an issue that needs to be addressed (e.g., a user information update, an answer to a question, etc.) that an agent may be able to address without further information being acquired from the user. In such scenarios, the response action may include performing one or more actions to address the issue expressed n the recorded message, and/or providing to the user a confirmation of the actions taken to address the issue raised in the recorded message. Feedback data with annotation training, examples of unmodified LLM output data matched with preferred matching LLM output data, and other such training data can be generated from such input data to support and improve such systems.

In some aspects, the process 400 can be supported by artificial intelligence (AI) and/or large language model (LLM) systems. For example, recorded message data can be analyzed by AI/LLM systems to enhance message while on hold functionality in accordance with aspects described herein. For example, such systems can support voice to text, text to voice, and/or message summarization features to enhance any aspects of a system described herein. Such operations can additionally be used to facilitate storage of conversation data and/or connection to separate AI/LLM systems used to analyze conversation data in accordance with aspects described herein. Such systems can generate training data or updates to AI/LLM systems using conversation data, interaction data, user inputs, assessment data, or any other such data as feedback or training data.

Figure 5:
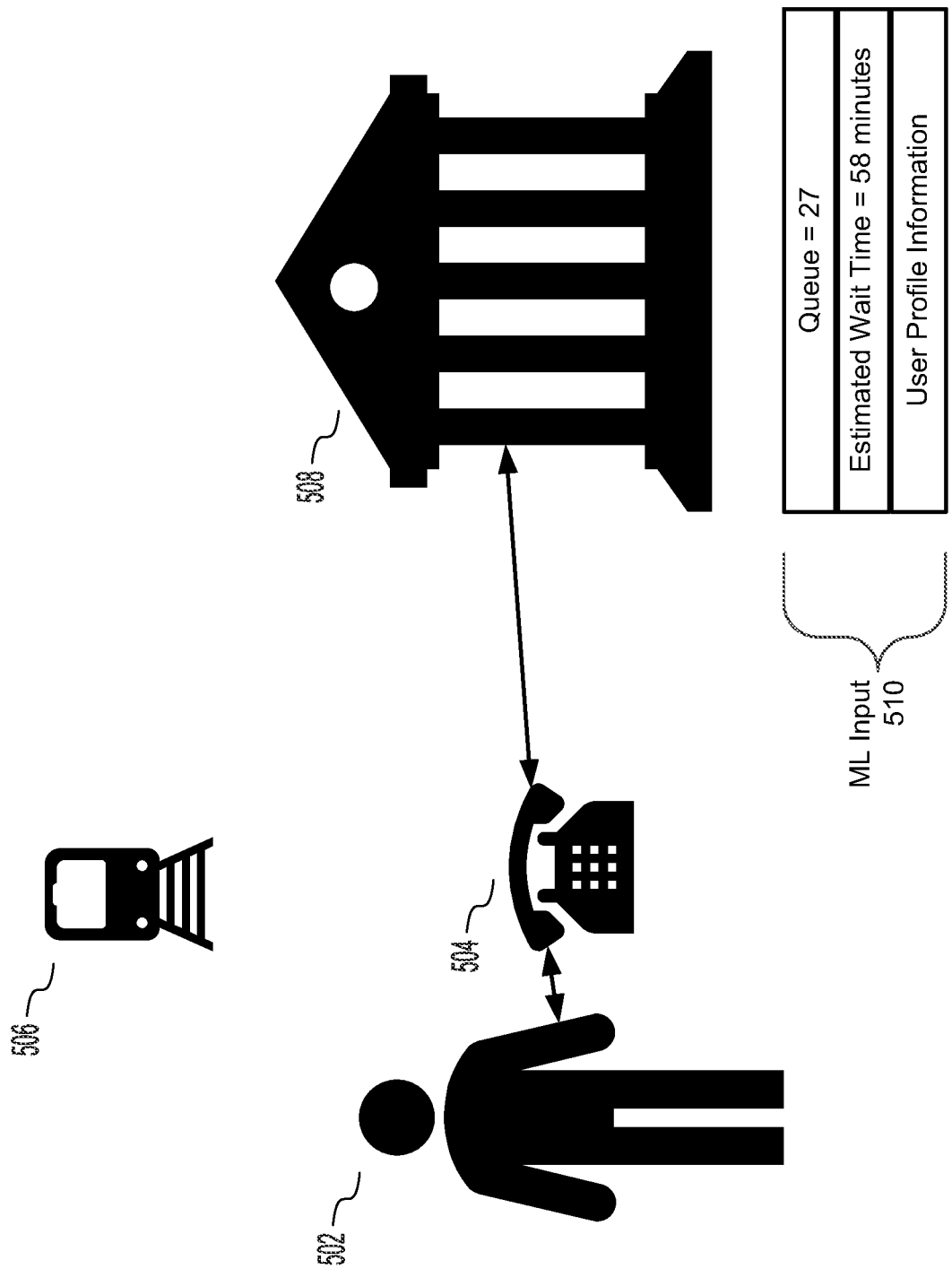
FIG. 5 shows an illustrative example of a scenario in which a user seeks service from a bank via a voice call in accordance with one or more embodiments described herein.

FIG. 5 illustrates an example of a user seeking service from an entity in accordance with one or more embodiments described herein. The following example is for explanatory purposes only and not intended to limit the scope of examples described herein. Additionally, while the example shows certain aspects of examples described herein, all possible aspects of embodiments examples may not be illustrated in this particular example.

Consider a scenario in which a user 502 has used a website accessed from a computing device to determine that a recent charge on a bank account of the user appears to be a fraudulent charge, as it was neither initiated nor authorized by the user 502. In such a scenario, the user 502 may decide to contact the bank 508 with which the user 502 has the account. To that end, the user 502 may use a user device 504, which in this scenario is a landline telephone device. In one or more embodiments, the user 502 initiates a communication with the bank 508 by dialing on the user device 504 a phone number associated with the bank 508.

In one or more embodiments, a voice call processing system (not shown) of the bank 508 receives the call from the user device 504. In one or more embodiments, the voice call processing system interacts with an availability device to determine if any agents are currently available to take the voice call. In this scenario, no such agents are available to take the voice call. Accordingly, the voice call processing system must determine whether and/or how long the user should be placed on hold to wait for an available agent.

In one or more embodiments, after the availability device of the bank 508 determines that no agent is available to take the call, the voice call processing system determines whether to provide to the user 502 via the user device 504 an option to record a message rather than to remain on hold. To that end, a record option ML algorithm of the voice call processing system is be invoked to determine when to offer an option to record a message rather than remain on hold to a user 502.

In one or more embodiments, the record option ML algorithm is provided various items of ML input information 510, which includes, but are not limited to, a current queue depth of twenty-seven, an estimated current wait time of fifty-eight minutes, and information related to the user 502 as part of user profile information.

In one or more embodiments, based on the aforementioned inputs, the record option ML algorithm also determines that the user is a valued customer, and that the user has implicitly and/or explicitly expressed dissatisfaction with remaining on hold. Based on the inputs the record option ML algorithm provides to the voice call processing system a result indicating that the user should be provided an option to record a message before being placed on hold.

In one or more embodiments, in response to the result provided by the record option ML algorithm, the voice call processing system provides to the user an option to record a message rather than be put on hold to wait for an available agent. In this scenario, the user is informed via an audio message presented to the user device 504 that the user may leave a recorded message rather than wait on hold, that the user may press the number three to initiate leaving the recorded message, and that the user may hang up to initiate transmission of the message. The user is also reminded to provide relevant details regarding the issue that the user seeks to have addressed (e.g., transaction number, the amount of the fraudulent charge, the date the fraudulent charge appeared on the account, etc.).

In one or more embodiments, the user 502 determines that, based on the need of the user 502 to catch a train 506 to a destination, that the user 502 would prefer to leave a message rather than to remain on hold waiting for an available agent. Accordingly, the user presses the number three to initiate a recording of a recorded message.

In one or more embodiments, the user 502, via the user device 504, provides a recorded message that includes the requested details. In one or more embodiments, the voice call processing system then receives a recorded message from the user device 504.

In one or more embodiments, the recorded message is provided to an intent analyzer of an availability device corresponding to the bank 508. In one or more embodiments, the intent analyzer performs natural language processing using the content of the recorded message as input to provide as output a transcription of the content of the recorded message. In one or more embodiments, the transcribed content is provided to a machine learning algorithm as input, along with all or any portion of the ML input information 510, and any amount of other information. In one or more embodiments, the machine learning algorithm provides as output a subset if agent devices associated with agents capable of responding to the content of the recorded message. In this scenario, the machine learning algorithm identifies the intent as an intent to seek help regarding potential fraud on the user account with the bank 508, as well as a recommendation that the recorded message be provided to one or more agents in a fraud department of the bank 508.

In one or more embodiments, based on the recommendation provided by the machine learning algorithm of the intent analyzer of the bank 508, the recorded message is provided to an agent in the fraud department of the bank. The agent may complete any number of other actions related to any number of other voice calls or recorded messages received prior to being provided with the recorded message. In one or more embodiments, once the agent becomes available, the agent may assess the recorded message to determine a response action to perform. In this scenario, the agent determines that an appropriate response action is to call the user at the user device 504 to gain more information about the alleged fraudulent transaction.

Thus, the user 502 was able to convey information about a requested service to the bank 508 via recorded message rather than having to remain on hold waiting for an available agent to answer the voice call. Such an option allows the user to catch the train 506 while waiting for a response from an agent of the bank 508. In one or more embodiments, once the agent of the bank 508 calls the user 502 back, the user and the agent conduct a conversation by which the agent gains necessary information to allow the agent to reverse the fraudulent transaction, and send the transaction to a fraud resolution department of the bank 508.

Embodiments described herein may provide a framework for a user device to be used by a user to record a message for an entity from which the user seeks service without having to remain on hold until such time as an agent is available to service a voice call.

Aspects described above, including operations of the example of FIG. 5, an any methods described herein, can include operations performed by a computing device or system for large numbers of simultaneous or many simultaneous communications (e.g., hundreds, thousands, or more simultaneous communications). Such systems can allow for analysis one communication while other communications are used to update analysis systems at the same time that additional communications are received. For example, as described herein, a system can receive and analyze information for one communication (e.g., phone call or other communication), while using information for other communications to update analysis systems while the information for the other communication is being addressed (e.g., processed for an AI based hold response).

In various implementations, a connection management system or communication system can simultaneously manage voice communications with a hold system for hundreds, thousands, or any number of customers, human agents, and hold bots, depending on the resources available to the system. For a first customer, a system can implement first functionality, while at the same time the system allows a second functionality from a second customer as part of a second communication. Any functionality described herein can be performed simultaneously by a system for any number of users, so that many user can be supported at the same time.

FIG. 6 illustrates a computing system architecture 600, including various components in electrical communication with each other, in accordance with some embodiments The computing system architecture 600 may be used, in whole or in part, to perform all or any portion of the actions discussed above in the descriptions of FIGS. 1-5. The example computing system architecture 600 illustrated in FIG. 6 includes a computing device 602, which has various components in electrical communication with each other using a connection 606, such as a bus, in accordance with some implementations. The example computing system architecture 600 includes a processing unit or the processor 604 that is in electrical communication with various system components, using the connection 606, and including the system memory 614. In some embodiments, the system memory 614 includes read-only memory (ROM), random-access memory (RAM), and other such memory technologies including, but not limited to, those described herein. In some embodiments, the example computing system architecture 600 includes a cache 608 of high-speed memory connected directly with, in close proximity to, or integrated as part of the processor 604. The system architecture 600 can copy data from the memory 614 and/or the storage device 610 to the cache 608 for quick access by the processor 604. In this way, the cache 608 can provide a performance boost that decreases or eliminates processor delays in the processor 604 due to waiting for data. Using modules, methods and services such as those described herein, the processor 604 can be configured to perform various actions. In some embodiments, the cache 608 may include multiple types of cache including, for example, level one (L1) and level two (L2) cache. The memory 614 may be referred to herein as system memory or computer system memory. The memory 614 may include, at various times, elements of an operating system, one or more applications, data associated with the operating system or the one or more applications, or other such data associated with the computing device 602.

Other system memory 614 can be available for use as well. The memory 614 can include multiple different types of memory with different performance characteristics. The processor 604 can include any general purpose processor and one or more hardware or software services, such as service 612 stored in storage device 610, configured to control the processor 604 as well as a special-purpose processor where software instructions are incorporated into the actual processor design. The processor 604 can be a completely self-contained computing system, containing multiple cores or processors, connectors (e.g., buses), memory, memory controllers, caches, etc. In some embodiments, such a self-contained computing system with multiple cores is symmetric. In some embodiments, such a self-contained computing system with multiple cores is asymmetric. In some embodiments, the processor 604 can be a microprocessor, a microcontroller, a digital signal processor ("DSP"), or a combination of these and/or other types of processors. In some embodiments, the processor 604 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 600, an input device 616 can represent any number of input mechanisms, such as a microphone for speech, a touch-sensitive screen for gesture or graphical input, keyboard, mouse, motion input, pen, and other such input devices. An output device 618 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 600. In some embodiments, the input device 616 and/or the output device 618 can be coupled to the computing device 602 using a remote connection device such as, for example, a communication interface such as the network interface 620 described herein. In such embodiments, the communication interface can govern and manage the input and output received from the attached input device 616 and/or output device 618. As may be contemplated, there is no restriction on operating on any particular hardware arrangement and accordingly the basic features here may be substituted for other hardware, software, or firmware arrangements as they are developed.

In some embodiments, the storage device 610 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described herein, the storage device 610 can include hardware and/or software services such as service 612 that can control or configure the processor 604 to perform one or more functions including, but not limited to, the methods, processes, functions, systems, and services described herein in various embodiments. In some embodiments, the hardware or software services can be implemented as modules. As illustrated in example computing system architecture 600, the storage device 610 can be connected to other parts of the computing device 602 using the system connection 606. In an embodiment, a hardware service or hardware module such as service 612, that performs a function can include a software component stored in a non-transitory computer-readable medium that, in connection with the necessary hardware components, such as the processor 604, connection 606, cache 608, storage device 610, memory 614, input device 616, output device 618, and so forth, can carry out the functions such as those described herein.

The disclosed techniques for providing a user with an option to record a message rather than remain on hold may be performed using a computing system such as the example computing system illustrated in FIG. 6, using one or more components of the example computing system architecture 600. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some embodiments, the processor can be configured to carry out some or all of methods and systems described herein by, for example, executing code using a processor such as processor 604 wherein the code is stored in memory such as memory 614 as described herein. One or more of a user device, a provider server or system, a database system, or other such devices, services, or systems may include some or all of the components of the computing system such as the example computing system illustrated in FIG. 6, using one or more components of the example computing system architecture 600 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines;

and/or reside in a cloud computing system which may include one or more cloud components in one or more networks as described herein in association with the computing resources provider 628. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 604 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 614 can be coupled to the processor 604 by, for example, a connector such as connector 606, or a bus. As used herein, a connector or bus such as connector 606 is a communications system that transfers data between components within the computing device 602 and may, in some embodiments, be used to transfer data between computing devices. The connector 606 can be a data bus, a memory bus, a system bus, or other such data transfer mechanism. Examples of such connectors include, but are not limited to, an industry standard architecture (ISA" bus, an extended ISA (EISA) bus, a parallel AT attachment (PATA" bus (e.g., an integrated drive electronics (IDE) or an extended IDE (EIDE) bus), or the various types of parallel component interconnect (PCI) buses (e.g., PCI, PCIe, PCI-104, etc.).

The memory 614 can include RAM including, but not limited to, dynamic RAM (DRAM), static RAM (SRAM), synchronous dynamic RAM (SDRAM), non-volatile random access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 614 can also include magnetic or optical data storage media including read-only (e.g., CD ROM and DVD ROM) or otherwise (e.g., CD or DVD). The memory can be local, remote, or distributed.

As described herein, the connector 606 (or bus) can also couple the processor 604 to the storage device 610, which may include non-volatile memory or storage and which may also include a drive unit. In some embodiments, the non-volatile memory or storage is a magnetic floppy or hard disk, a magnetic-optical disk, an optical disk, a ROM (e.g., CD-ROM, DVD-ROM, EPROM, or EEPROM), a magnetic or optical card, or another form of storage for data. Some of this data may be written, by a direct memory access process, into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 610. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 606 can also couple the processor 604 to a network interface device such as the network interface 620. The interface can include one or more of a modem, network interface card (NIC), or other such network interfaces including, but not limited to those described herein. It will be appreciated that the network interface 620 may be considered to be part of the computing device 602 or may be separate from the computing device 602. The network interface 620 can include one or more of an analog modem, Integrated Services Digital Network (ISDN) modem, cable modem, token ring interface, satellite transmission interface, or other interfaces for coupling a computer system to other computer systems. In some embodiments, the network interface 620 can include one or more input and/or output (I/O) devices. The I/O devices can include, by way of example but not limitation, input devices such as input device 616 and/or output devices such as output device 618. For example, the network interface 620 may include a keyboard, a mouse, a printer, a scanner, a display device, and other such components. Other examples of input devices and output devices are described herein. In some embodiments, a communication interface device can be implemented as a complete and separate computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and descendants, Xenix™, SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, cCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some embodiments, the computing device 602 can be connected to one or more additional computing devices such as computing device 624 via a network 622 using a connection such as the network interface 620. In such embodiments, the computing device 624 may execute one or more services 626 to perform one or more functions under the control of, or on behalf of, programs and/or services operating on computing device 602. In some embodiments, a computing device such as computing device 624 may include one or more of the types of components as described in connection with computing device 602 including, but not limited to, a processor such as processor 604, a connection such as connection 606, a cache such as cache 608, a storage device such as storage device 610, memory such as memory 614, an input device such as input device 616, and an output device such as output device 618. In such embodiments, the computing device 624 can carry out the functions such as those described herein in connection with computing device 602. In some embodiments, the computing device 602 can be connected to a plurality of computing devices such as computing device 624, each of which may also be connected to a plurality of computing devices such as computing device 624. Such an embodiment may be referred to herein as a distributed computing environment.

The network 622 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IoT network) or any other such network or combination of networks. Communications via the network 622 can be wired connections, wireless connections, or combinations thereof. Communications via the network 622 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIFS), and other such communications protocols.

Communications over the network 622, within the computing device 602, within the computing device 624, or within the computing resources provider 628 can include information, which also may be referred to herein as content. The information may include text, graphics, audio, video, haptics, and/or any other information that can be provided to a user of the computing device such as the computing device 602. In an embodiment, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 602 and presented to a user of the computing device 602 using forms that are perceptible via sight, sound, smell, taste, touch, or other such mechanisms. In some embodiments, communications over the network 622 can be received and/or processed by a computing device configured as a server. Such communications can be sent and received using PHP: Hypertext Preprocessor ("PHP"), Python™, Ruby, Perl® and variants, Java®, HTML, XML, or another such server-side processing language.

In some embodiments, the computing device 602 and/or the computing device 624 can be connected to a computing resources provider 628 via the network 622 using a network interface. In such embodiments, one or more systems (e.g., service 630 and service 632) hosted within the computing resources provider 628 (also referred to herein as within "a computing resources provider environment") may execute one or more services to perform one or more functions under the control of, or on behalf of, programs and/or services operating on computing device 602 and/or computing device 624. Systems such as service 630 and service 632 may include one or more computing devices such as those described herein to execute computer code to perform the one or more functions under the control of, or on behalf of, programs and/or services operating on computing device 602 and/or computing device 624.

For example, the computing resources provider 628 may provide a service, operating on service 630 to store data for the computing device 602 when, for example, the amount of data that the computing device 602 attempts to store exceeds the capacity of storage device 610. In another example, the computing resources provider 628 may provide a service to first instantiate a virtual machine (VM) on service 632, use that VM to access the data stored on service 632, perform one or more operations on that data, and provide a result of those one or more operations to the computing device 602. Such operations (e.g., data storage and VM instantiation) may be referred to herein as operating "in the cloud," "within a cloud computing environment," or "within a hosted virtual machine environment," and the computing resources provider 628 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 628 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, serverless hosting, virtual reality (VR) systems, and augmented reality (AR) systems. Various techniques to facilitate such services include, but are not limited to, virtual machines, virtual storage, database services, system schedulers (e.g., hypervisors), resource management systems, various types of short-term, mid-term, long-term, and archival storage devices, etc.

As may be contemplated, the systems such as service 630 and service 632 may implement versions of various services (e.g., the service 612 or the service 626) on behalf of, or under the control of, computing device 602 and/or computing device 624. Such implemented versions of various services may involve one or more virtualization techniques so that, for example, it may appear to a user of computing device 602 that the service 612 is executing on the computing device 602 when the service is executing on, for example, service 630. As may also be contemplated, the various services operating within the computing resources provider 628 environment may be distributed among various systems within the environment as well as partially distributed onto computing device 624 and/or computing device 602.

In an embodiment, the computing device 602 can be connected to one or more additional computing devices and/or services such as merchant computing device 636 and/or a point-of-sale service 634 via the network 622 and using a connection such as the network interface 620. In an embodiment, the point-of-sale service 634 is separate from the merchant computing device 636. In an embodiment, the point-of-sale service 634 is executing on the merchant computing device 636. In an embodiment, the point-of-sale service 634 is executing as one or more services (e.g., the service 630 and/or the service 632) operating within the environment of the computing resources provider. As used herein, a point-of-sale service 634 is a service used by one or more merchants to manage sales transactions for customers, to process payment transactions for customers (e.g., credit card transactions), to manage inventory for merchants, to identify customers based on, for example, customer loyalty programs, and other such tasks.

In an embodiment, a customer and/or a merchant uses the merchant computing device 636 to interact with the point-of-sale service 634. In an embodiment, the merchant computing device 636 is a dedicated point-of-service (POS) terminal. In an embodiment, the merchant computing device 636 is a cash register system. In an embodiment, the merchant computing device 636 is an application or web service operating on a computing device such as the computing device 602 described herein. In such an embodiment, the application or web service may be provided by a financial services system (e.g., a bank, a transaction processing system, an inventory management system, or some other such financial services system). In an embodiment, the merchant computing device 636 includes an auxiliary device or system to execute tasks associated with the point-of-sale service 634 (e.g., a credit card processing device attached to a smart phone or tablet). In an embodiment, the merchant computing device 636 is a kiosk that is located at a merchant location (e.g., in a merchant's "brick and mortar" store), in a high traffic area (e.g., in a mall or in an airport concourse), or at some other such location. In such an embodiment, the kiosk may include additional branding elements to allow associating the kiosk with a vendor or retailer. In an embodiment, the merchant computing device 636 is a virtual device (e.g., a virtual kiosk) such as the virtual devices described herein. Although not illustrated here, in an embodiment, the merchant computing device 636 may be one of a plurality of devices that may be interconnected using a network such as the network 622.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a keypad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to store data temporarily or permanently.

A network interface, such as a wireless or wired interface, can enable the computing device to communicate with a network. Examples of computing devices (e.g., the computing device 602) include, but are not limited to, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described herein. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The computing system architecture 600 can be used to support computer-implemented methods in accordance with any aspects described herein. For example, the computing device 602 or multiple instances of such devices can be used to support message while on hold systems. Such support can include analysis of data from a conversation in process that can be used to train artificial intelligence, language model, machine learning, or other such systems in real time while the conversation is occurring, and while other conversations are occurring. This can allow data from one conversation to update and improve operations of language models, machine learning systems, artificial intelligence systems, etc. for another conversation while both conversations are occurring at the same time within a system.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies modules of disclosed herein.

Some portions of the detailed description herein may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram. Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed, but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations). For example, a language model generated using machine learning, artificial intelligence, a supervised training technique, or any combination of details provided herein can be used to analyze communications for a conversation as part of a system for message while on hold functionality. Additionally, as described herein, data from a conversation in process and supported by a message while on hold system can be used to train such support systems in real time while the conversation is occurring, and while other conversations are occurring, such that data from one conversation can be used to update and improve operations of language models, machine learning systems, artificial intelligence systems, etc. for another conversation while both conversations are occurring simultaneously within a system. Processors 604 can, for example, support AI/LLM processes, including managing LLM access, data storage access to database and other such operations of a system (e.g., LLM scheduling, intermediate application programming interface formatting for LLM communications, etc.)

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform the necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital assistant (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computing device 602.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to illustrate embodiments more clearly and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top, and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described herein. The elements and acts of the various examples described herein can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described herein to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one or more embodiments, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described herein may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use.

What is claimed is:
1. A computer-implemented method comprising:
 determining that a trigger condition is met during an ongoing communication session including a user device, wherein the user device is presented with an option to record a message, and wherein determining that the trigger condition is met includes using a recording option machine learning algorithm to process communication outcome data from other users;

receiving a recorded message in response to a record message option provided upon the trigger condition being met, wherein the trigger condition being met corresponds to positive outcomes for the other users;

analyzing the recorded message and determining an intent for the recorded message by processing the recorded message through a natural language processor, and wherein processing includes determining content and inputting the content into an intent analyzer machine learning algorithm to determine the intent; and providing the recorded message to an agent based on the determined intent, wherein when the agent receives the recorded message, the agent performs a response action after assessing the recorded message, and wherein the likelihood of a positive outcome following the response action is increased using the communication outcome data from the other users.

2. The computer-implemented method of claim 1, wherein determining that the trigger condition is met includes determining that a hold time has exceeded a hold time threshold.

3. The computer-implemented method of claim 1, wherein determining that the trigger condition is met includes determining, before the ongoing communication session, that an expected wait time exceeds a wait time threshold.

4. The computer-implemented method of claim 1, wherein determining that the trigger condition is met includes determining, before the ongoing communication session, that a queue depth exceeds a queue depth threshold.

5. The computer-implemented method of claim 1, wherein determining that the trigger condition is met includes analyzing, via the recording option machine learning algorithm, data associated with a user corresponding to the user device from which a voice call is received and real-time information corresponding to agent device availability.

6. The computer-implemented method of claim 1, wherein the response action includes facilitating a communication between an agent device.

7. The computer-implemented method of claim 1, wherein performing the response action includes:

performing an issue resolution action; and providing an indication to the user device that the issue resolution action is completed.

8. The computer-implemented method of claim 1, wherein the recorded message includes a voice recording.

9. The computer-implemented method of claim 1, wherein the recorded message includes an alternate message format.

10. The computer-implemented method of claim 1, wherein the record message option includes an option to speak the message at any time during a call hold.

11. The computer-implemented method of claim 1, further comprising:

assessing a plurality of agents to determine which agents are suitable for responding to the intent; and ranking the plurality of agents according to suitability;

wherein providing the recorded message to the agent is further based on suitability.

12. A system, comprising:

one or more processors; and memory storing thereon instructions that, as a result of being executed by the one or more processors, cause the system to:

determine that a trigger condition is met during an ongoing communication session including a user device, wherein the user device is presented with an option to record a message, and wherein determining that the trigger condition is met includes using a recording option machine learning algorithm to process communication outcome data from other users;

receive a recorded message in response to a record message option provided upon the trigger condition being met, wherein the trigger condition being met corresponds to positive outcomes for the other users;

analyze the recorded message and determining an intent for the recorded message by processing the recorded message through a natural language processor, and wherein processing includes determining content and inputting the content into an intent analyzer machine learning algorithm to determine the intent; and provide the recorded message to an agent based on the determined intent, wherein when the agent receives the recorded message, the agent performs a response action after assessing the recorded message, and wherein the likelihood of a positive outcome following the response action is increased using the communication outcome data from the other users.

13. The system of claim 12, wherein determining that the trigger condition is met includes determining that a hold time has exceeded a hold time threshold.

14. The system of claim 12, wherein determining that the trigger condition is met includes determining, before the ongoing communication session, that an expected wait time exceeds a wait time threshold.

15. The system of claim 12, wherein determining that the trigger condition is met includes determining, before the ongoing communication session, that a queue depth exceeds a queue depth threshold.

16. The system of claim 12, wherein determining that the trigger condition is met includes analyzing, via the recording option machine learning algorithm, data associated with a user corresponding to the user device from which a voice call is received and real-time information corresponding to agent device availability.

17. The system of claim 12, wherein the response action includes facilitating a communication between an agent device.

18. The system of claim 12, wherein, to perform the response action, the one or more processors execute further instructions that cause the system to:

perform an issue resolution action; and provide an indication to the user device that the issue resolution action is completed.

19. The system of claim 12, wherein the recorded message includes a voice recording.

20. The system of claim 12, wherein the recorded message includes an alternate message format.

21. The system of claim 12, wherein the record message option includes an option to speak the message at any time during a call hold.

22. The system of claim 12, wherein the instructions further cause the system to:

assess a plurality of agents to determine which agents are suitable for responding to the intent; and rank the plurality of agents according to suitability;

wherein providing the recorded message to the agent is further based on suitability.

23. A non-transitory, computer-readable storage medium storing thereon executable instructions that, as a result of being executed by a computer system, cause the computer system to:
- determine that a trigger condition is met during an ongoing communication session including a user device, wherein the user device is presented with an option to record a message, and wherein determining that the trigger condition is met includes using a recording option machine learning algorithm to process communication outcome data from other users;
- receive a recorded message in response to a record message option provided upon the trigger condition being met, wherein the trigger condition being met corresponds to positive outcomes for the other users;
- analyze the recorded message and determining an intent for the recorded message by processing the recorded message through a natural language processor, and wherein processing includes determining content and inputting the content into an intent analyzer machine learning algorithm to determine the intent; and
- provide the recorded message to an agent based on the determined intent, wherein when the agent receives the recorded message, the agent performs a response action after assessing the recorded message, and wherein the likelihood of a positive outcome following the response action is increased using the communication outcome data from the other users.

24. The non-transitory, computer-readable storage medium of claim 23, wherein determining that the trigger condition is met includes determining that a hold time has exceeded a hold time threshold.

25. The non-transitory, computer-readable storage medium of claim 23, wherein determining that the trigger condition is met includes determining, before the ongoing communication session, that an expected wait time exceeds a wait time threshold.

26. The non-transitory, computer-readable storage medium of claim 23, wherein determining that the trigger condition is met includes determining, before the ongoing communication session, that a queue depth exceeds a queue depth threshold.

27. The non-transitory, computer-readable storage medium of claim 23, wherein the response action includes facilitating a communication between an agent device; and
wherein, to perform the response action, the executable instructions further cause the computer system to:
perform an issue resolution action; and
provide an indication to the user device that the issue resolution action is completed.

* * * * *